US012803469B2

(12) United States Patent
Li et al.

(10) Patent No.: US 12,803,469 B2
(45) Date of Patent: Nov. 17, 2026

(54) BIDIRECTIONAL ISOLATED AC-DC CONVERTER

(71) Applicant: Parker-Hannifin Corporation, Cleveland, OH (US)

(72) Inventors: Mark Y. Li, Irvine, CA (US); Shengming Li, Irvine, CA (US); Patrick C. Toops, Charleston, WV (US)

(73) Assignee: Parker-Hannifin Corporation, Cleveland, OH (US)

( * ) Notice: Subject to any disclaimer, the term of this patent is extended or adjusted under 35 U.S.C. 154(b) by 134 days.

(21) Appl. No.: 18/857,977

(22) PCT Filed: Jun. 21, 2023

(86) PCT No.: PCT/US2023/025799
§ 371 (c)(1),
(2) Date: Oct. 18, 2024

(87) PCT Pub. No.: WO2024/019854
PCT Pub. Date: Jan. 25, 2024

(65) Prior Publication Data
US 2025/0260342 A1 Aug. 14, 2025

Related U.S. Application Data

(60) Provisional application No. 63/390,694, filed on Jul. 20, 2022.

(51) Int. Cl.
*H02M 7/797* (2006.01)
*H02M 1/00* (2007.01)
(Continued)

(52) U.S. Cl.
CPC ........... *H02M 7/797* (2013.01); *H02M 1/007* (2021.05); *H02M 1/4233* (2013.01); *H02M 3/01* (2021.05);
(Continued)

(58) Field of Classification Search
CPC ...... H02M 1/007; H02M 1/42; H02M 1/4208; H02M 1/4216; H02M 1/4233;
(Continued)

(56) References Cited

U.S. PATENT DOCUMENTS

2020/0412238 A1* 12/2020 Zhu ..................... H02M 1/4241
2022/0029551 A1 1/2022 Park et al.
(Continued)

FOREIGN PATENT DOCUMENTS

CH 715318 A2 * 3/2020 ............ H02M 7/487
CN 104253547 A 12/2014
(Continued)

OTHER PUBLICATIONS

Wang Hanwei et al, "Research for a three-level T-type grid-connected converter based on the simplified three-level SVPWM modulation scheme and neutral point potential balancing," IEEJ Trans. on Elec. and Electron. Eng., vol. 16, No. 4, Apr. 20, 2021, pp. 609-617, DOI: 10.1002/tee.23182 (Year: 2021).*
(Continued)

*Primary Examiner* — Fred E Finch, III
(74) *Attorney, Agent, or Firm* — Renner, Otto, Boisselle & Sklar, LLP

(57) ABSTRACT

A bidirectional high voltage AC-DC converter includes a primary three-phase three-level T-type power factor correction circuit, a full-bridge switching circuit connected to the primary three-phase three-level T-type power factor correction circuit output, an isolated capacitor-inductor-inductor-capacitor (CLLC) resonant tank connected to the full-bridge
(Continued)

BIDIRECTIONAL ISOLATED AC/DC POWER CONVERSION FOR USE IN MORE ELECTRIC AIRCRAFT APPLICATIONS switching circuit, a T-type full-bridge output topology circuit connected to the CLLC resonant circuit, and a controller that controls one or more of the components of the bidirectional isolated high voltage AC-DC converter. The primary three-phase three-level T-type power factor correction circuit and the secondary three-level circuit include a split DC-link bus with respective voltages that are actively controlled by the controller. The CLLC resonant converter circuit includes an isolation transformer that electrically isolates the primary side from the secondary side of the bidirectional isolated high voltage AC-DC converter. A control method includes synthesizing, via a modified space vector pulse width modulation (SVPWM) scheme or a variable-amplitude double-carrier sine-triangle PWM with capacitor bank middle point voltage control, one or more output voltages of the front end three-phase three-level T-type PFC circuit, wherein the modified SVPWM scheme is based, at least in part on a nearest four vectors technique.

17 Claims, 6 Drawing Sheets

(51) Int. Cl.

| | |
|---|---|
| ***H02M 1/42*** | (2007.01) |
| ***H02M 3/00*** | (2006.01) |
| ***H02M 3/335*** | (2006.01) |
| ***H02M 7/483*** | (2007.01) |
| ***H02M 7/487*** | (2007.01) |
| ***H02M 7/5387*** | (2007.01) |
| ***H02M 7/5395*** | (2006.01) |

(52) U.S. Cl.
CPC ..... *H02M 3/33584* (2013.01); *H02M 7/4833* (2021.05); *H02M 7/53876* (2021.05); *H02M 1/4216* (2013.01); *H02M 3/33573* (2021.05); *H02M 7/487* (2013.01); *H02M 7/5395* (2013.01)

(58) Field of Classification Search
CPC ..... H02M 3/335–33592; H02M 7/483; H02M 7/4833; H02M 7/487; H02M 7/5387–5395
See application file for complete search history.

(56) References Cited

U.S. PATENT DOCUMENTS

| | | | | |
|---|---|---|---|---|
| 2022/0085725 | A1* | 3/2022 | Kolar | H02M 3/33573 |
| 2022/0321016 | A1* | 10/2022 | Khaligh | H02M 1/10 |
| 2023/0128970 | A1* | 4/2023 | Teeneti | H02M 5/2932 323/234 |
| 2023/0223861 | A1* | 7/2023 | Everts | H02J 7/02 363/125 |

FOREIGN PATENT DOCUMENTS

| | | | | | |
|---|---|---|---|---|---|
| CN | 109768728 | A | | 5/2019 | |
| WO | 2020106324 | A1 | | 5/2020 | |
| WO | WO-2021247008 | A1 | * | 12/2021 | H02M 1/0043 |

OTHER PUBLICATIONS

K. Sun et al, "Improved Modulation Mechanism of Parallel-Operated T-Type Three-Level PWM Rectifiers for Neutral-Point Potential Balancing and Circulating Current Suppression," in IEEE Transactions on Power Electronics, vol. 33, No. 9, pp. 7466-7479, Sep. 2018, doi: 10.1109/TPEL.2017.2772025. (Year: 2018).*

International Search Report and Written Opinion issued for corresponding International Application No. PCT/US2023/025799, mailed Sep. 29, 2023.

Chen Zhiyuan et al.: "The Tolerance Control Method Based on Zero-Sequence Circulating Current Suppression for Parallel T-Type Three-Level Rectifiers", IEEE Journal of Emerging and Selected Topics in Power Electronics, IEEE, Piscataway, NJ, USA, vol. 10, No. 4, Oct. 6, 2021 (Oct. 6, 2021), pp. 4383-4394.

Siebke Konstantin et al.: "Comparison of a Dual Active Bridge and CLLC Converter for On-Board Vehicle Chargers using GaN and Time Domain Modeling Method", 2020 IEEE Energy Conversion Congress and Exposition (ECCE), IEEE, Oct. 11, 2020 (Oct. 11, 2020), pp. 1210-1216.

Yan Qingzeng et al.: "An Analytical Discontinuous Space-Vector PWM for Three-Level Inverters With Unbalanced DC-Link Voltages", IEEE Transactions on Power Electronics, Institute of Electrical and Electronics Engineers, USA, vol. 37, No. 7,Jan. 27, 2022 (Jan. 27, 2022), pp. 7718-7728.

* cited by examiner

BIDIRECTIONAL ISOLATED AC-DC CONVERTER

This application is a national phase of International Application No. PCT/US2023/025799 filed Jun. 21, 2023, which claims priority to U.S. Provisional Application No. 63/390,694, filed Jul. 20, 2022, each of which is hereby incorporated herein by reference in its entirety.

FIELD OF INVENTION

The present application relates generally to bidirectional AC-DC converters, and more particularly to a bidirectional isolated high voltage AC-DC converter and a method of controlling the bidirectional AC-DC converter.

BACKGROUND OF THE INVENTION

As many vehicles, including aircraft or vessels, shift to the application of electric motors for propulsion or other electric power needs, DC or AC voltage buses that operate at significantly higher voltage levels from what is typical today are emerging to handle the ever-increasing electrical power levels. For example, conventional vehicle AC power distribution networks typically use transformer rectification units (TRUs) for AC-DC conversion, which are bulky, heavy, and have low efficiency. Some conventional vehicle AC power distribution networks replace TRUs with auto-transformer rectification units (ATRUs), which have a higher power density and higher efficiency compared to conventional TRUs. However, one drawback associated with the ATRUs is the loss of valuable electrical isolation.

With the latest advances in power electronics technology, especially the adoption of the wide bandgap power devices (SiC and GaN), the ATRU solution can only be classified as "expedient" or "make-do," since the sacrifice of electrical isolation is high and the gain in power density and efficiency is low. The latest power electronics technology necessitates revolutionizing this classical function with the needed power density, efficiency, and intelligent fault processing capability without sacrificing the isolation benefits.

Traditional flight actuation controllers normally dissipate the regenerative energy internally with braking resistors. Unfortunately, this reduces system efficiency and results in higher operating temperature. With the advent of next generation MEA microgrid power systems, the restriction of prohibiting any regenerated energy flowing back to the AC system could be lifted, at least for cases with low duty cycle energy back flow such as what would happen with vehicle motor-driven actuation. Designing for bidirectional power flow capability will become a new design paradigm to meet the goal of higher energy efficiency and reduced impact on the environment.

SUMMARY OF INVENTION

The present application describes a bidirectional high voltage AC-DC converter. The bidirectional high voltage AC-DC converter utilizes the latest power electronics technology to provide a high-density bidirectional isolated power processing unit enabling the use of standard vehicle actuation products on vehicles with electric power systems with AC power buses, with additional features benefiting the system level design of the actuation system.

Embodiments of the present application utilize innovative AC/DC conversion topology implemented by wide bandgap GaN devices to perform bidirectional power conversion between AC power sources and a split DC bus output, which may be referenced to a vehicle chassis, with requisite electrical isolation. The bidirectional power flow enables the regenerative energy by the flight actuators to flow back to the AC power source increasing the overall system efficiency. An advantageous feature for partial discharge hazard management with the split DC bus is provided to achieve an optimized electrically driven actuation system, and other power needs for vehicle applications where high-altitude operation would pose significant challenge from high voltage power buses.

In exemplary embodiments, the bidirectional high voltage AC-DC converter includes a primary three-phase three-level T-type power factor correction circuit, a switching circuit connected to the primary three-phase three-level T-type power factor correction circuit, an isolated capacitor-inductor-inductor-capacitor (CLLC) resonant converter circuit connected to the switching circuit, a T-type full bridge output topology circuit connected to the CLLC resonant converter circuit, and a controller that controls one or more of the components of the bidirectional isolated high voltage AC-DC converter. The primary three-phase three-level T-type power factor correction circuit and the secondary three-level circuit include a split DC-link bus with respective voltages that are actively controlled by the controller. The CLLC resonant converter circuit includes an isolation transformer that electrically separates the primary side from the secondary side of the bidirectional isolated high voltage AC-DC converter.

The primary three-phase three-level T-type power factor correction circuit interfaces with a high voltage AC power bus, and the secondary three-level circuit interfaces with a split DC-link bus with regulated symmetrical internal DC buses connected to a chassis as a common reference. For example, the regulated symmetrical internal DC buses may be configured as +135 VDC or +270 VDC. With this AC/DC converter, an advanced motor controller design with soft start and best inrush control and superior disconnect functionality upon motor drive inverter failure is achieved.

The bidirectional isolated high voltage AC-DC converter of the present disclosure provides an optimized solution to system level partial discharge hazard management with optimized actuator design. It also enables interfacing of standard actuation products, such as +135 VDC or +270 VDC flight control actuation systems, with high voltage AC buses.

An aspect of the invention, therefore, is a bidirectional AC-DC converter circuit. In exemplary embodiments, the bidirectional AC-DC converter comprises a three-phase three-level T-type power factor correction (PFC) circuit including a primary split DC-link bus; a switching circuit connected to the three-phase three-level T-type power factor correction circuit; a capacitor-inductor-inductor-capacitor (CLLC) resonant converter circuit connected to the switching circuit, the CLLC resonant converter circuit including an isolation transformer; and a three-level T-type full bridge output circuit connected to the CLLC resonant converter circuit, the three-level T-type full bridge output circuit including a secondary split DC-link bus; wherein the isolation transformer isolates the switching circuit from the three-level T-type full bridge output circuit.

In an exemplary embodiment, the bidirectional AC-DC converter further comprises a controller for controlling the front-end three-phase three-level T-type power factor correction (PFC) circuit. In exemplary embodiments, a control method comprises synthesizing, via a modified space vector pulse width modulation (SVPWM) scheme, the rectification voltages of the front end three-phase three-level T-type PFC circuit; wherein the modified SVPWM scheme is based on a nearest-four-vectors technique.

In an exemplary embodiment, the method for controlling a front-end three-phase three-level T-type power factor correction (PFC) circuit further comprises determining a nearest first vector, a nearest second vector, a nearest third vector, and a nearest fourth vector, wherein two of the nearest first, second, third, or fourth vectors result in an output current $i_o$ with opposite signs, wherein the two nearest vectors resulting in the current with opposite signs are used to calculate a combined nearest vector, and wherein a nearest three vector synthesis is performed on the combined nearest vector and two other nearest vectors.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
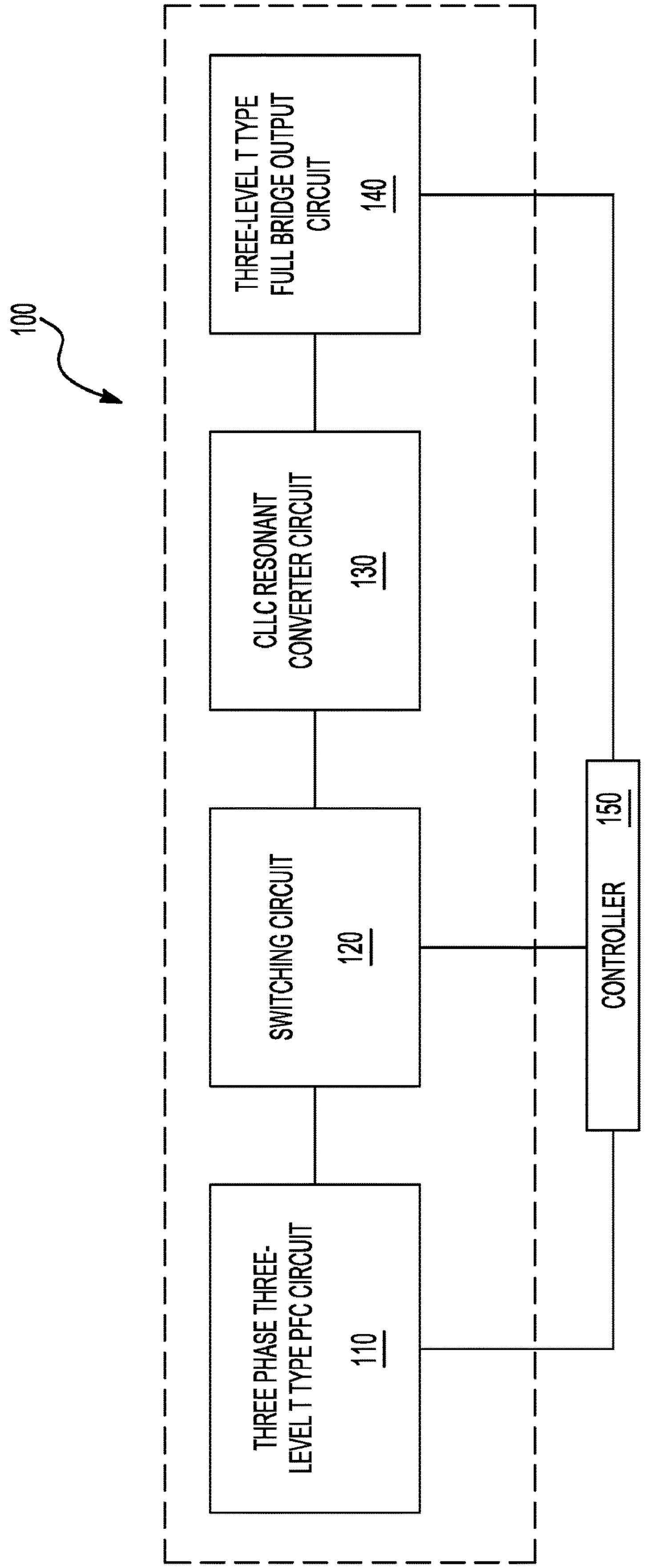
FIG. 1 is a drawing depicting a schematic block diagram of an exemplary bidirectional isolated high voltage AC-DC converter.

Embodiments of the present application will now be described with reference to the drawings, wherein like reference numerals are used to refer to like elements throughout. It will be understood that the figures are not necessarily to scale.

Figure 2:
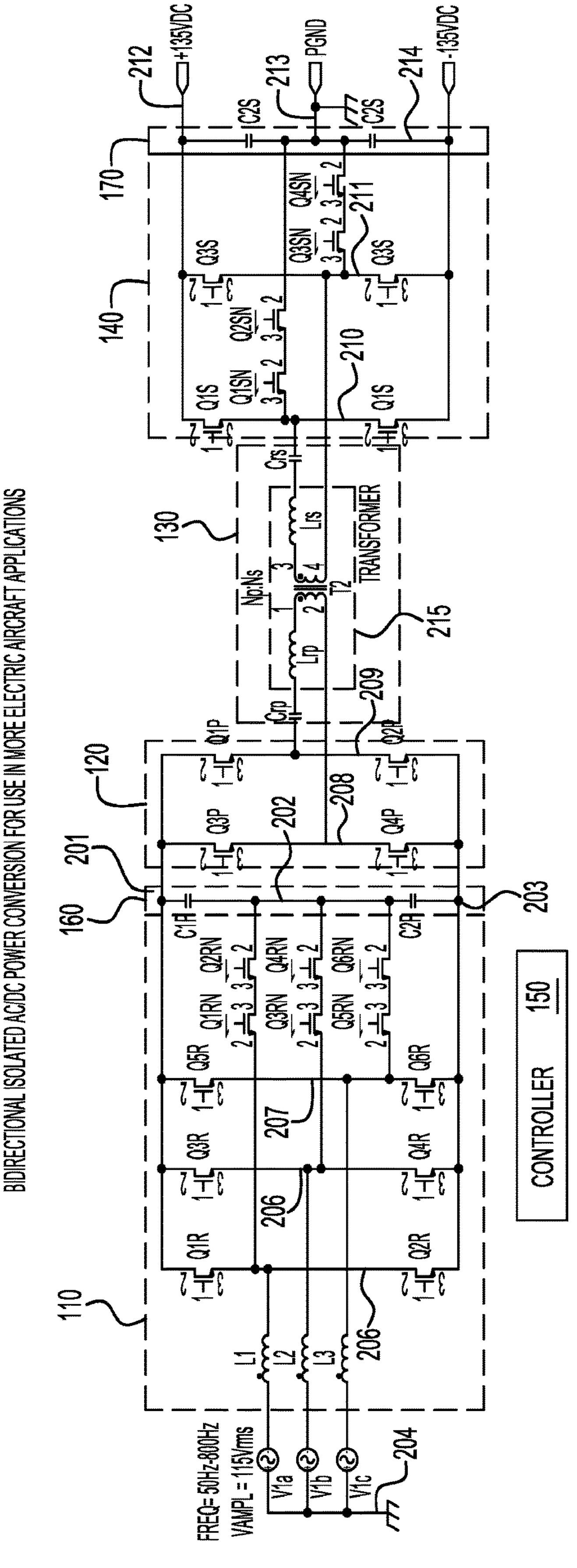
FIG. 2 is a drawing depicting an exemplary electrical circuit diagram of the bidirectional isolated high voltage AC-DC converter.

FIG. 1 illustrates a schematic block diagram of an exemplary bidirectional isolated AC-DC converter 100. FIG. 2 is a more detailed circuit diagram illustrating components of the bidirectional isolated AC-DC converter 100 of FIG. 1. In the example of FIGS. 1 and 2, the bidirectional isolated AC-DC converter 100 includes a front-end three-phase three-level T-type power factor correction (PFC) circuit 110 including a primary split DC-link bus 160, a switching circuit 120 connected to the primary split DC-link bus, a capacitor-inductor-inductor-capacitor (CLLC) resonant converter circuit 130 connected to the switching circuit 120, and a three-level T-type full bridge output circuit 140 connected to The CLLC resonant converter circuit 130.

With reference in particular to the circuit diagram of FIG. 2, the primary split DC-link bus 160 includes a primary positive DC bus 201, a primary middle point bus 202, and a primary negative bus 203. The CLLC resonant converter circuit 130 includes an isolation transformer 215 that electrically isolates the switching circuit from the three-level T-type full bridge output circuit. The three-level T-type full bridge output circuit includes a secondary split DC bus 170. The secondary split DC bus 170 includes a secondary positive DC bus 212, a secondary middle point bus 213, and a secondary negative DC bus 214. In the depicted example, the secondary positive DC bus 212 is +135 VDC, the secondary middle point bus 213 is connected to a ground, and the secondary negative DC bus 213 is −135 VDC. The secondary positive DC bus 212 and the secondary negative DC bus 214 are regulated and symmetrical. The ground may be referenced to an electronics chassis, such as for example a chassis of a vehicle.

One or more controllers 150 are used to control the front-end three-phase three-level T-type PFC circuit 110, the switching circuit 120, and/or the three-level T-type full bridge output circuit 140. For example, the one or more controllers can be used to actively split the secondary split DC bus 170 to achieve optimized high voltage management of partial discharge hazards and optimized actuator design using the secondary positive DC bus 212 and the secondary negative DC bus 214. Equipped with this AC/DC converter 100, an advanced motor controller design with soft start techniques enables improved inrush current control and disconnect functionality upon motor drive inverter failure. In addition, a modified space vector pulse width modulation (SVPWM) scheme is used to operate the front-end three-phase three level T-type PFC circuit. While the bidirectional isolated AC-DC converter has been described as using three-level three-phase topologies, the bidirectional isolated AC-DC converter can also be used as a single-phase AC-DC power converter.

The primary three-phase three-level T-type power factor correction circuit 110 includes a primary AC bus 204, three inductors, L1, L2, and L3, a first primary phase leg 205, a second primary phase leg 206, a third primary phase leg 207, and the primary split DC-link bus 160. The primary AC bus 204 includes three AC voltage sources, V1*a*, V1*b*, and V1*c*.

The first primary phase leg 205 includes switching devices Q1R, Q2R, Q1RN, and Q2RN. The second primary phase leg 206 includes switching devices Q3R, Q4R, Q3RN, and Q4RN. The third primary phase leg 207 includes switching devices Q5R, Q6R, Q5RN, and Q6RN. The first primary phase leg 205, the second primary phase leg 206, and the third primary phase leg 207 are connected to the primary capacitor middle point of the primary split DC-link bus 160 through Q1RN/Q2RN, Q3RN/Q4RN and Q5RN/Q6RN respectively. Switching devices Q1R, Q2R, Q1RN, and Q2RN of the first primary phase leg 205, switching devices Q3R, Q4R, Q3RN, and Q4RN of the second primary phase leg 206, and switching devices Q5R, Q6R, Q5RN, and Q6RN of the third primary phase leg 207, can be controlled to implement various switching stages as described more fully below.

The primary split-DC-link bus 160 includes capacitors C1P and C2P, a primary capacitor middle point 202, and a primary DC negative reference voltage 203. The primary capacitor middle point 202 voltage is actively controlled via the controller such as by applying PWM control signals.

The switching circuit 120 includes a first switching leg 208 and a second switching leg 209. The first switching leg 208 contains switching devices Q3P and Q4P. The second switching leg 209 contains switching devices Q1P and Q2P.

The CLLC resonant converter circuit 130 includes resonant capacitors Crp and Crs, resonant inductors Lrp and Lrs, and an isolation transformer T2/215. Resonant capacitor Crp and resonant inductor Lrp are connected in series with one another, and resonant capacitor Crs and resonant inductor Lrs are connected in series with one another. Isolation transformer T2/215 includes a primary winding and a secondary winding. The primary winding includes terminals 1 and 2 and the secondary winding includes terminals 3 and 4. Resonant inductor Lrp is connected to terminal 1 of the primary winding and resonant inductor Lrs is connected to terminal 3 of the secondary winding. Resonant capacitor Crp is connected to the second switching leg 209 of the switching circuit at a point between switching devices Q1P and Q2P. Terminal 2 of the primary winding is connected to the first switching leg 208 at a point between switching devices Q3P and Q4P. The resonant inductor Lrp, resonant inductor Lrs and the isolation transformer T2/215 can be integrated into a single physical device. The CLLC resonant converter circuit operates to provide electrical isolation, voltage gain or reduction, and energy transfer. With the correct parameters, the CLLC resonant converter circuit also enables zero voltage switching of the power switches within the primary phase legs in the forward power flow condition and within the secondary phase legs in the reverse power flow condition.

The secondary T-type three-level circuit 140 includes a secondary split DC-link bus 170, a first secondary phase leg 210, and a second secondary phase leg 211. The secondary split DC-link bus 170 includes capacitors C1S and C2S, a secondary positive DC bus 212, a secondary capacitor middle point 213, and a secondary negative DC bus 214. In the example of FIG. 2, the secondary positive DC bus 212 is associated with a positive low voltage DC power, e.g., +135 VDC, the secondary capacitor middle point 213 voltage is the secondary reference and is associated with the secondary capacitor middle point 213, and the secondary negative DC bus 214 is associated with a negative low voltage DC power, e.g., −135 VDC. The secondary capacitor middle point 213 voltage is actively controlled via the controller 150 such as by applying PWM control signals.

The first secondary phase leg 210 includes switching devices Q1S, Q2S, Q1SN, and Q2SN. The second secondary phase leg 211 includes switching devices Q3S, Q4S, Q3SN, and Q4SN. The first secondary phase leg 210 and the second secondary phase leg 211 are connected to the secondary capacitor middle point 213 of the secondary split DC-link bus 170 through Q1SN/Q2SN and Q3S/Q4SN respectively. Switching devices Q1S, Q2S, Q1SN, and Q2SN of the first secondary phase leg 210, and switching devices Q3S, Q4S, Q3SN, and Q4SN of the second secondary phase leg 211, can be controlled to implement various switching stages as described more fully below.

When operating in the forward direction, the primary three-phase three-level T-type power factor correction circuit 110 receives an input voltage from the AC power bus 204, such as 115Vrms, from a power bus of a vehicle. The controller 150 applies control signals, such as PWM Control signals, to the switching devices Q1R-Q6R and Q1RN-Q6RN to apply power factor correction resulting in a high-quality, regulated DC voltage. The primary capacitor middle point voltage regulation function, such as the active middle point primary voltage control, can be integrated into the PWM control signals which determines the pulse duration and sequence of the phase terminal at each of the possible voltage levels. The controller 150 applies control signals, such as PWM control signals, to the switching devices Q1P-Q4P to modulate the DC voltage into a high-frequency AC square wave. The isolation transformer 215 of the CLLC resonant converter circuit 130 steps down the high frequency alternating voltage. The controller 150 applies control signals, such as PWM control signals, to the switching devices Q1S-Q4S and Q1SN-Q4SN of the secondary T-type three-level output circuit 140 to rectify the high frequency alternating voltage into a relatively low VDC output voltage, such as for example a ±135 VDC or ±270 VDC voltage, to power low voltage loads. The switching devices Q1P-Q4P are zero voltage switched through the CLLC resonant convert circuit in the forward power flow condition. Likewise, the switching devices Q1S-Q4S are zero voltage switched under the backward power flow condition.

The secondary capacitor middle point 213 voltage regulation function, such as active middle point secondary voltage control, can be integrated into the PWM control signals. Since the isolation transformer 215 is present in the resonant conversion process, the secondary capacitor middle point 213 can be connected to a ground that is referenced to an electronics chassis. In this example, the result is a ±135 VDC internal power bus with the secondary capacitor middle point 213 referenced to the electronics chassis.

When operating in the reverse direction, the secondary T-type three-level circuit 140 output receives an input VDC voltage, such as for example a ±135 VDC voltage, from a low voltage source. The controller 150 applies control signals, such as PWM control signals, to the switching devices Q1S-Q4S and Q1SN-Q4SN to modulate the ±135 VDC voltage into a high-frequency AC square wave. The isolation transformer 215 of the CLLC resonant converter circuit steps up the high frequency alternating voltage. The controller applies control signals, such as PWM control signals, to the switching devices Q1P-Q4P of the switching circuit 120 to rectify the high frequency alternating voltage into a relatively high VDC output voltage. The controller 150 applies control signals, such as PWM control signals, to the switching devices Q1R-Q6R and Q1RN-Q6RN to invert the DC voltage into an AC output voltage, to supply power to the AC power bus 204.

Figure 3:
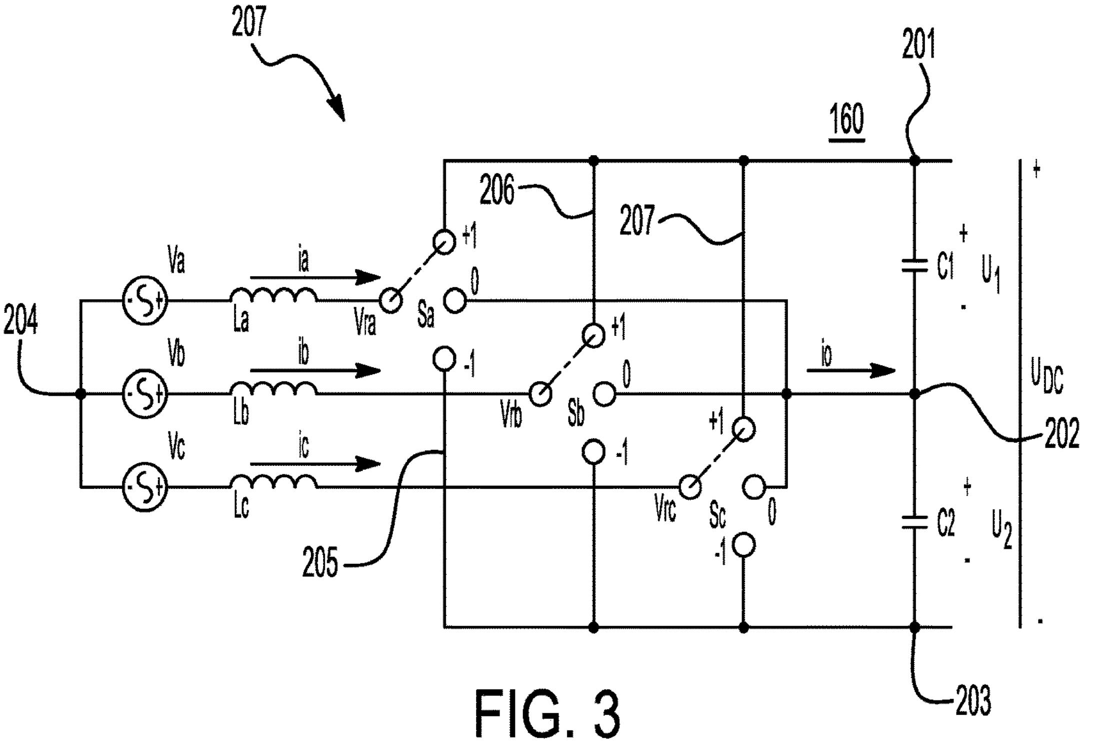
FIG. 3 is a drawing depicting an exemplary analytical model of the bidirectional isolated high voltage AC-DC converter.

FIG. 3 illustrates an exemplary analytical model of the front-end three-phase three level T-type PFC circuit with circuit variable definitions. The switching variables $S_a$, $S_b$, $S_c$ shown in FIG. 3 are defined as follows:

$$S_i = \begin{cases} +1, \text{ when connected to the positive DC bus} \\ 0, \text{ when connected to the capacitor middle point, } i = a, b, \text{ or } c \\ -1, \text{ when connected to the negative DC bus} \end{cases}$$

Let $$v = \frac{1}{2}(u_1 - u_2), \text{ then } u_1 = v + \frac{u_{DC}}{2} \text{ and } u_2 = -v + \frac{u_{DC}}{2}.$$

-continued $$v_{ri}=\begin{cases} v+\frac{u_{DC}}{2}, & \text{when } S_i=+1\\ 0, & \text{when } S_i=0, \text{ so } v_{ri}=S_i^2v+S_i\frac{u_{DC}}{2}, i=a, b, \text{ or } c\\ v-\frac{u_{DC}}{2}, & \text{when } S_i=-1\end{cases}$$

The one or more controllers utilize SVPWM switching of the active power devices, e.g., gallium nitride high electron mobility transistors (GaN HEMTs), of the front-end three-phase three-level T-type PFC circuit to synthesize $v_{ra}$, $v_{rb}$, $v_{rc}$ according to current regulation requirements. The synthesis process can be represented mathematically via a space vector format. That is, rectifier voltage space vector $\vec{v}_{rabc}$ can be defined according to the following equations:

$$\vec{v}_{rabc}=\frac{2}{3}(v_{ra}+\alpha v_{rb}+\alpha^2v_{rc}), \text{ where } \alpha=e^{j\frac{2\pi}{3}}, \text{ and}$$

$$\vec{v}_{rabc}=v\frac{2}{3}(S_a^2+\alpha S_b^2+\alpha^2S_c^2)+\frac{u_{DC}}{2}\frac{2}{3}(S_a+\alpha S_b+\alpha^2S_c).$$

Converting $$\vec{v}_{rabc}=v\frac{2}{3}(S_a^2+\alpha S_b^2+\alpha^2S_c^2)+\frac{u_{DC}}{2}\frac{2}{3}(S_a+\alpha S_b+\alpha^2S_c)$$

to per unit voltage with base $$V_{base}=\frac{u_{DC}}{2}$$

provides:

$$\vec{v}_{rabc,pu}=v_{pu}\frac{2}{3}(S_a^2+\alpha S_b^2+\alpha^2S_c^2)+\frac{2}{3}(S_a+\alpha S_b+\alpha^2S_c),$$

$$\text{where } v_{pu}=\frac{v}{V_{base}}=\frac{v}{\frac{u_{DC}}{2}}.$$

Figure 4:
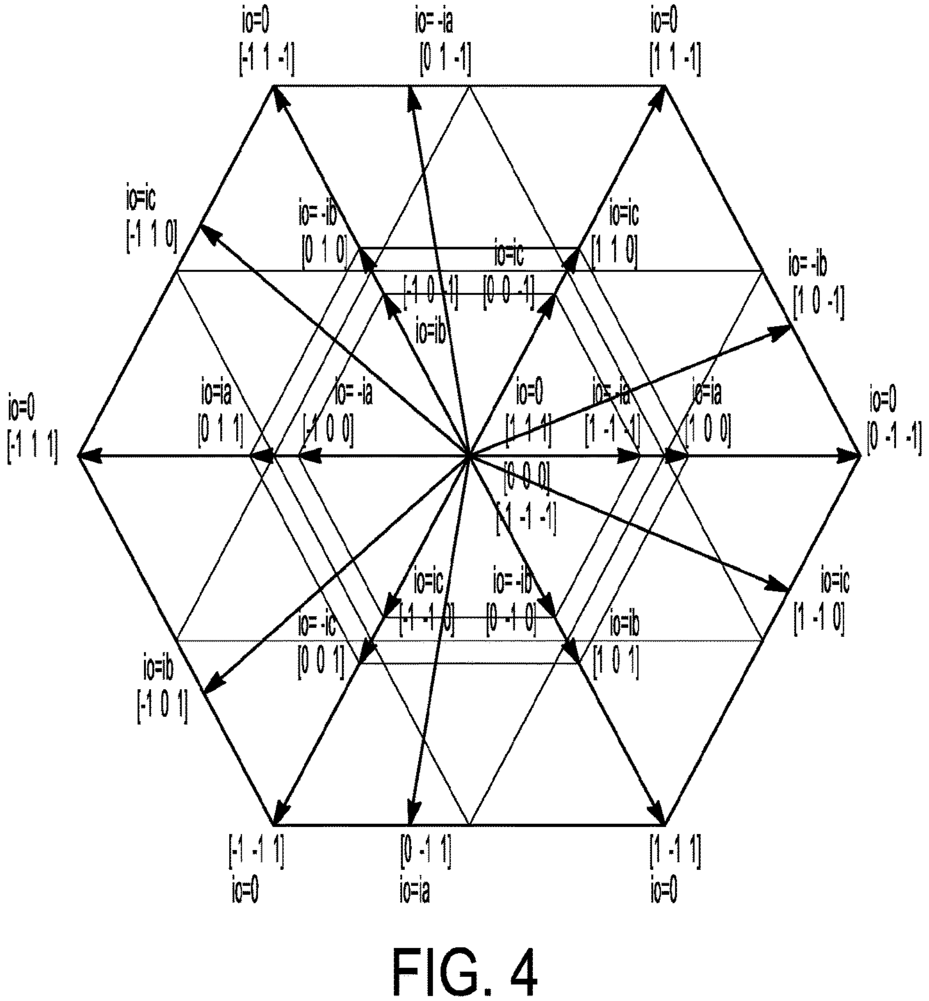
FIG. 4 is a drawing depicting a two-dimensional space vector diagram of the primary side three-level full bridge converter.

In contrast to conventional space vector representation, embodiments of the present application use a modified space vector representation that accounts for the capacitor middle point deviation variable v or $v_{pu}$, i.e., the DC voltage distribution between the capacitors is accounted for. The resultant switching space vector diagram is shown in FIG. 4 where it is assumed that v≥0 and all vectors are identified by the triplet $[S_aS_bS_c]$. The associated information for the current flowing into the capacitor middle point is also marked in the switching space vector diagram of FIG. 4.

In contrast to conventional space vector diagrams, middle vectors of the switching space vector diagram of FIG. 4 are dispersed due to unbalanced capacitor voltage distribution. As such, to synthesize the required voltage vector, generally Nearest Four Vector (NFV) techniques are used. The described configuration thus implements a modified SVPWM scheme as a simplified NFV technique and NTV technique. For example, an exemplary modified SVPWM scheme can be implemented as described below.

Assuming that the two capacitors $C_1$ and $C_2$ of FIG. 3 are of equal capacitance, i.e., $C_1=C_2=C$. Then $$2C\frac{dv}{df}=-i_0,$$

and by applying sliding mode control with sliding surface {v=0}, or by directly checking based on Lyapunov stability criteria, the middle two vectors aligned in the same direction are weighted differentially to result in an $i_0$ having a sign that is favorable for regulating v to zero.

Figure 5:
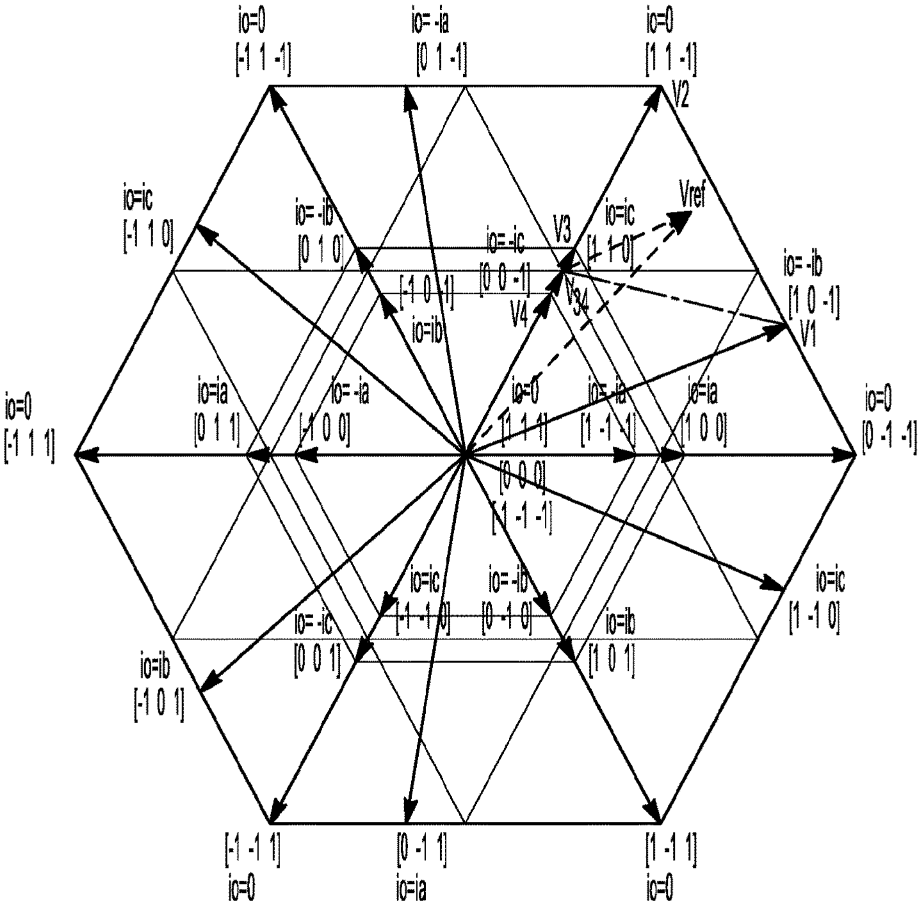
FIG. 5 is a drawing depicting a two-dimensional space vector diagram showing the voltage space vector synthesis of the primary side three-level full bridge converter.

FIG. 5 illustrates an exemplary voltage space vector synthesis using the modified SVPWM scheme based on the high-fidelity switching space vector diagram of FIG. 4. To synthesize voltage vector $\overrightarrow{v_{ref}}$, the NFVs are determined to be $\overrightarrow{v_1}, \overrightarrow{v_2}, \overrightarrow{v_3}, \overrightarrow{v_4}$. Firstly, find $\overrightarrow{v_{34}}=k\overrightarrow{v_3}+(1-k)\overrightarrow{v_4}$, where k is the degree of design freedom allocated for the capacitor middle point voltage regulator. This is possible because $\overrightarrow{v_3}$ and $\overrightarrow{v_4}$ result in $i_0$ with opposite signs. Once $\overrightarrow{v_{34}}$ is determined, the remaining task is to perform the NTV synthesis based on $\overrightarrow{v_1}, \overrightarrow{v_2}, \overrightarrow{v_3}, \overrightarrow{v_4}$:

$$T_1(\overrightarrow{v_1}-\overrightarrow{v_{34}})+T_2(\overrightarrow{v_2}-\overrightarrow{v_{34}})=\frac{T_s}{2}\overrightarrow{v_{ref}}$$

$$T_{34}=\frac{T_s}{2}-T_1-T_2$$

In the front-end three-phase three level T-type PFC circuit, the AC phase current is normally aligned with the voltage vector, i.e., a displacement angle of 0 degrees for positive power flow or 180 degrees for negative power flow. As such, there is no ambiguity of the role of the middle space vectors in the capacitor middle point voltage control process.

Figure 6:
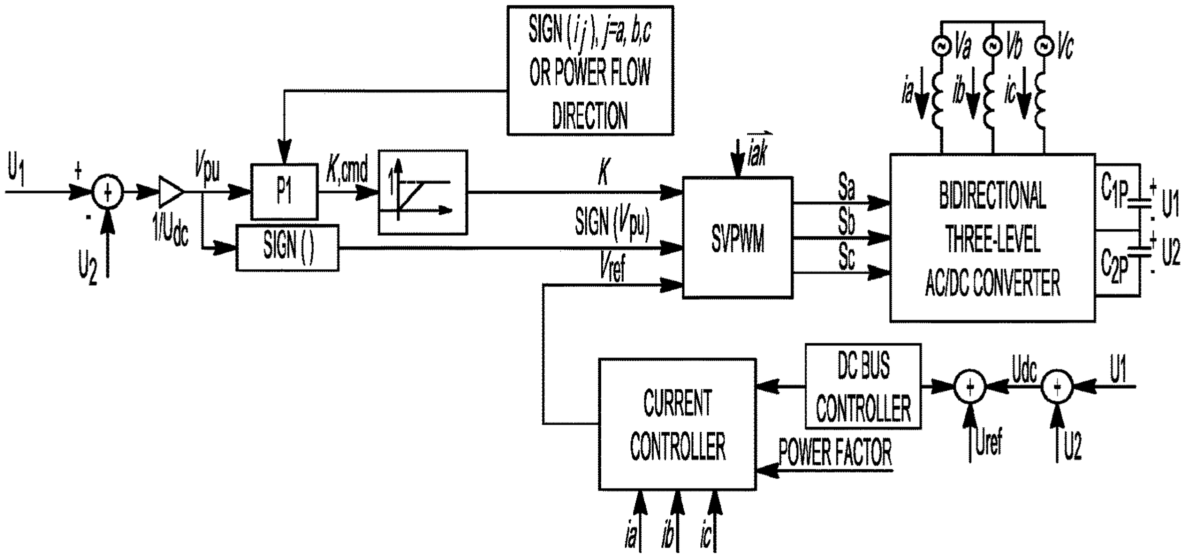
FIG. 6 is a drawing depicting a PFC stage control loop structure with an exemplified NFV SVPWM.
Figure 7:
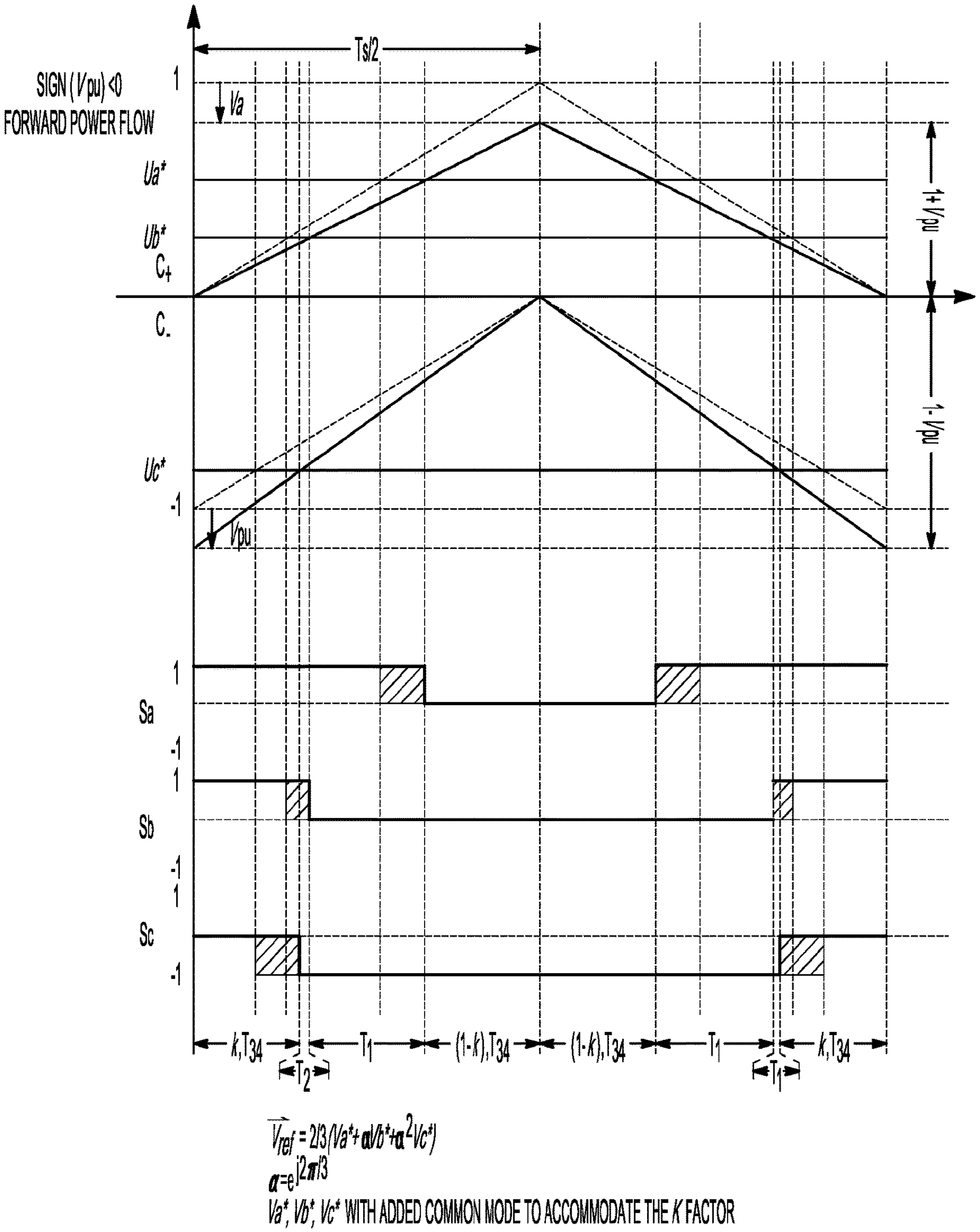
FIG. 7 is a drawing depicting a variable-amplitude double-carrier sine-triangle PWM implementation of the exemplified NFV SVPWM of the PFC stage.

FIG. 6 summarizes the AC/DC Front-end PFC stage control loop structure with the exemplified NFV SVPWM. Double carrier based PWM with variable carrier amplitude to reflect the true voltage distribution condition on the output capacitors can be utilized to implement an equivalent SVPWM algorithm in a sine-triangle PWM fashion. FIG. 7 illustrates the variable-amplitude double-carrier sine-triangle PWM details and visualizes the effects of capacitor bank middle point voltage deviation (exemplified by $v_{pu}$≤0) on the pulse width timing parameters. The PWM control of the DC/DC converter stage is described in Applicant's international patent application PCT/US2023/64008, which is incorporated here by reference.

Accordingly, the bidirectional isolated AC-DC converter uses a three-level output topology with active middle point voltage control and an isolation transformer to split the output into symmetrical dual supplies with a common reference connected to a chassis. This arrangement results in an optimized solution to the system level partial discharge hazard management and enables interfacing standard ±135 VDC or ±270 VDC flight control actuation systems to aircraft and other vehicle applications. A modified SVPWM scheme is used to operate the front-end three-phase three level T-type PFC circuit based on the high-fidelity switching space vector diagram of FIG. 4 such that input phase current distortions due to capacitor middle point voltage deviations are eliminated. The isolation topology of the CLLC resonant converter circuit allows the output to be soft started with required inrush current control during abrupt application of the input voltage. In some embodiments, the bidirectional isolated AC-DC converter is implemented with an advanced health monitoring functionality and, if warranted, the bidirectional isolated AC-DC converter can disconnect the motor drive inverter from the associated power bus safely upon motor drive inverter failure. Furthermore, in the event one of the phases is lost, the bidirectional isolated AC-DC converter can operate based on a single-phase AC-DC algorithm. In addition, the bidirectional isolated AC-DC converter can operate standard flight control actuators without regenerate energy being dissipated inside the box, i.e., regenerative energy can be sent back to the source. One exemplary transistor that can be used by the bidirectional isolated AC-DC converter includes GaN HEMTs, which provide relatively high-power density and high efficiency.

Figure 8:
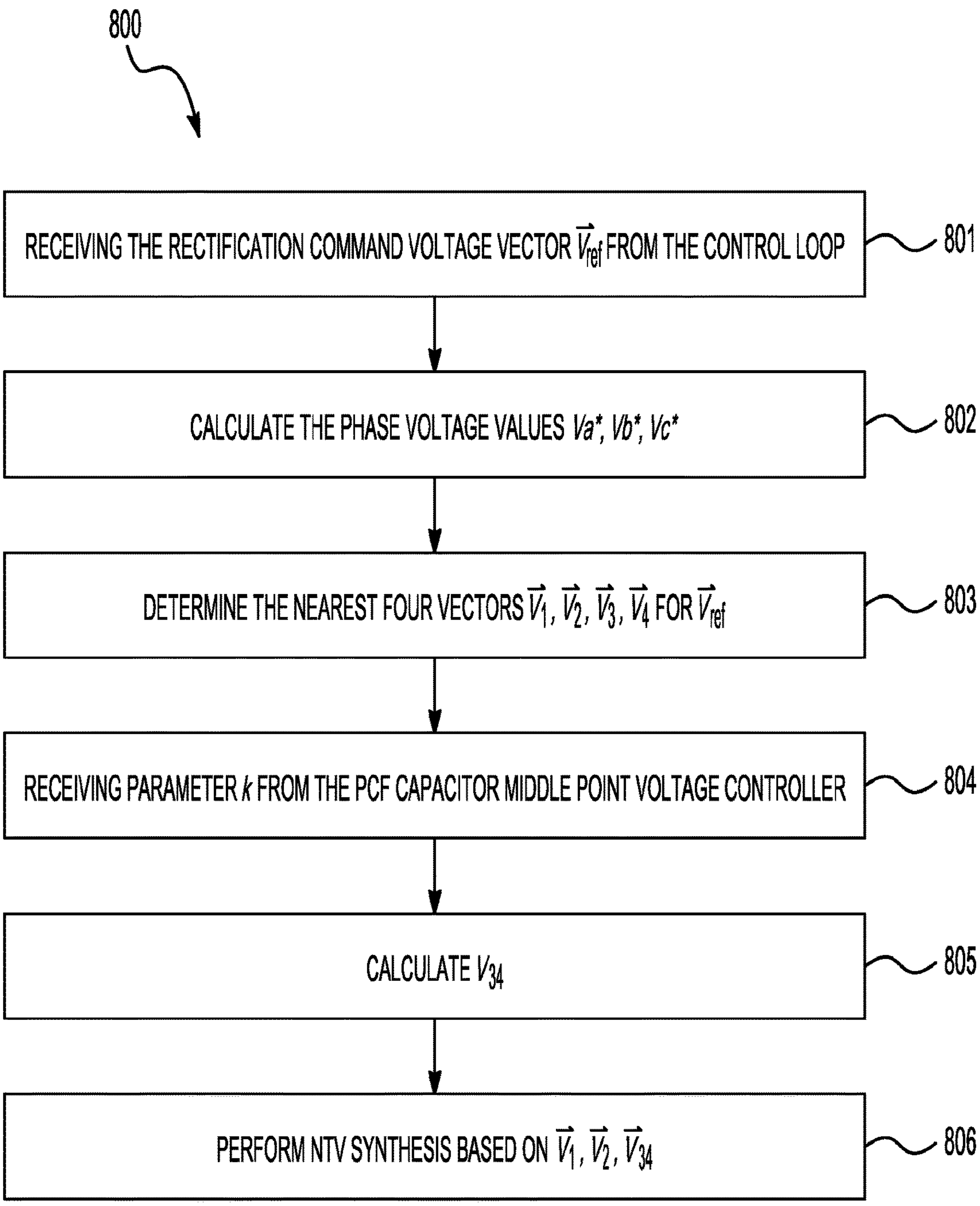
FIG. 8 is a drawing depicting an exemplary flow diagram of a method for controlling a bidirectionally converting a high AC voltage to DC voltage.

FIG. 8 illustrates an exemplary flow diagram for a method 800 for synthesizing via the modified space vector pulse width modulation (SVPWM) scheme, one or more rectification voltages of the front end three-phase three-level T-type PFC circuit. At step 801 and step 802, the voltage values at each of three branches, a, b, and c, $v_a^*, v_b^*, v_c^*$ are calculated. At step 803, a modified SVPWM switching space vector diagram is used to find the four nearest vectors $\overrightarrow{v_1}, \overrightarrow{v_2}, \overrightarrow{v_3}$ and $\overrightarrow{v_4}$ for voltage vector $\overrightarrow{v_{ref}}$ are determined. At step 804 and step 805, $\overrightarrow{v_{34}}$ is calculated based on the PFC capacitor bank middle voltage controller's requirement on parameter $k$. At step 806, NTV-like synthesis is performed based on $\overrightarrow{v_1}, \overrightarrow{v_2}$ and $\overrightarrow{v_{34.}}$. A similar algorithm flow diagram can be drawn for the variable-amplitude double-carrier sine-triangle PWM implementation of the exemplified three-level PFC stage control. In an exemplary embodiment, a phase leg rectification voltage command $v_a^*, v_b^*$ or $v_c^*$ is generated through the rectifier voltage space vector $\overrightarrow{v_{ref}}$ by the inverse Clarke transformation and by incorporating a common mode voltage implementing a primary capacitor bank middle point voltage control parameter $k$.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A bidirectional AC-DC converter comprising:

a three-phase power factor correction (PFC) circuit including a primary split DC-link bus;

a switching circuit connected to the primary split DC link bus, wherein the PFC circuit and the switching circuit constitute a primary side of the bidirectional AC-DC converter;

a capacitor-inductor-inductor-capacitor (CLLC) resonant converter circuit connected to the switching circuit, the CLLC resonant converter circuit including an isolation transformer;

a three-level T-type full bridge output circuit connected to the CLLC resonant converter circuit on a secondary side of the bidirectional AC-DC converter, the three-level T-type full bridge output circuit including a secondary split DC-link bus; and a controller configured to perform a modified space vector pulse width modulation (SVPWM) scheme to control the three-phase PFC circuit, the modified SVPWM scheme being based, at least in part, on a nearest four vectors technique, wherein the isolation transformer electrically isolates the primary side of the bidirectional AC-DC converter from the three-level T-type full bridge output circuit on the secondary side bidirectional AC-DC converter, wherein the three-phase PFC circuit has three branches, wherein each of the three branches has a different branch voltage, wherein the primary split DC-link bus includes a first primary capacitor and a second primary capacitor having a primary capacitor bank middle point voltage, wherein the controller is configured to calculate a rectifier voltage space vector using three switching functions associated with the three branches, primary split DC-link bus voltage, and primary capacitor bank middle point deviation voltage, and wherein the controller is configured to synthesize the rectifier voltage space vector through the modified SVPWM with primary capacitor bank middle point voltage control through a high-fidelity switching space vector diagram incorporating the capacitor bank middle point voltage deviation.

2. The bidirectional AC-DC converter according to claim 1, wherein the primary split DC-link bus includes a primary middle point bus associated with a primary capacitor bank middle point voltage; and wherein the controller that is configured to actively control the primary capacitor bank middle point voltage associated with the primary middle point bus.

3. The bidirectional AC-DC converter according to claim 2, wherein the secondary split DC-link bus includes a secondary middle point bus associated with a secondary capacitor middle point voltage; and the controller is further configured to actively control the secondary capacitor middle point voltage associated with the secondary middle point bus.

4. The bidirectional AC-DC converter according to claim 1, wherein the primary split DC-link bus includes a primary positive DC bus and a primary negative DC bus that are symmetrical with one another.

5. The bidirectional AC-DC converter according to claim 1, wherein the secondary split DC-link bus includes a secondary positive DC bus and a secondary negative DC bus that are symmetrical with one another; and wherein the secondary middle point bus is connected to a ground that is referenced to an electronics chassis.

6. The bidirectional AC-DC converter according to claim 1, wherein the switching circuit comprises a plurality of transistors arranged in a full bridge configuration.

7. The bidirectional AC-DC converter according to claim 1, wherein the three-phase power factor correction (PFC) circuit includes three inductors and a three-level T-type phase leg topology capable of bidirectional power flow; and wherein the T-type full bridge output circuit includes a plurality of transistors configured for switching between three output levels.

8. A method performed by a controller for controlling a front-end three-phase three-level T-type power factor correction (PFC) circuit comprising:

synthesizing, via a modified space vector pulse width modulation (SVPWM) scheme, rectification voltages of a front end three-phase three-level T-type PFC circuit;

wherein the modified SVPWM scheme is based, at least in part, on a nearest four vectors technique;

wherein the front-end three-phase three-level T-type PFC circuit has three branches, wherein each of the three branches has a different branch voltage;

wherein the controller calculates a rectifier voltage space vector using three switching functions associated with the three branches, a primary split DC-link bus voltage, and a primary capacitor bank middle point deviation voltage; and wherein the controller synthesizes the rectifier voltage space vector with primary capacitor bank middle point voltage control through the modified SVPWM through a high-fidelity switching space vector diagram incorporating the primary capacitor bank middle point deviation voltage.

9. The method for controlling a front-end three-phase three-level T-type power factor correction (PFC) circuit according to claim 8, further comprising a PWM switching function controlling a phase leg with a first state, a second state, and a third state;

wherein a primary split DC-link bus includes a primary positive DC bus, a primary middle point bus, and a primary negative DC bus that are symmetrical with one another; and wherein in the first state, the phase leg is connected to the positive DC bus.

10. The method for controlling a front-end three-phase three-level T-type power factor correction (PFC) circuit according to claim 9, further comprising a PWM switching function controlling a phase leg with a first state, a second state, and a third state;

wherein in the second state, the phase leg is connected to the primary middle point bus.

11. The method for controlling a front-end three-phase three-level T-type power factor correction (PFC) circuit according to claim 8, further comprising determining a nearest first vector, a nearest second vector, a nearest third vector, and a nearest fourth vector, wherein two of the nearest first, second, third, or fourth vectors of middle length in the switching space vector diagram result in a primary capacitor bank middle point charging current $i_o$ with opposite signs.

12. The method for controlling a front-end three-phase three-level T-type power factor correction (PFC) circuit according to claim 11, wherein the two nearest vectors resulting in the current with opposite signs are used to calculate a combined nearest vector.

13. The method for controlling a front-end three-phase three-level T-type power factor correction (PFC) circuit according to claim 12, wherein a standard nearest three vector PWM synthesis is performed on the combined nearest vector and two other nearest vectors.

14. A method performed by a controller for controlling a front-end three-phase three-level T-type power factor correction (PFC) circuit, comprising:

synthesizing, via a modified space vector pulse width modulation (SVPWM) scheme, rectification voltages of a front-end three-phase three-level T-type PFC circuit;

wherein the modified SVPWM scheme is based, at least in part, on a nearest four vectors technique;

wherein the front-end three-phase three-level T-type PFC circuit has three branches, wherein each of the three branches has a different branch voltage;

wherein the controller calculates a rectifier voltage space vector using three switching functions associated with the three branches, a primary split DC-link bus voltage, and a primary capacitor bank middle point deviation voltage, and rectifier voltage space vectors are generated from all switching function combinations collectively from a switching space vector diagram of the front-end PFC; and wherein the rectifier voltage space vector is synthesized through a variable-amplitude double-carrier sine-triangle PWM with primary capacitor bank middle point voltage control.

15. The method for controlling a front-end three-phase three-level T-type power factor correction (PFC) circuit according to claim 14, further comprising generating a plurality of variable-amplitude double-carrier waveforms by modulating a carrier amplitude with a primary capacitor bank voltage distribution discrepancy $$v_{pu} = \frac{v}{V_{base}} = \frac{v}{\frac{u_{DC}}{2}},$$

wherein a positive carrier and a negative carrier bear an amplitude which reflects an ongoing DC bus voltage distribution among a primary high side capacitor and a primary low side capacitor.

16. The method for controlling a front-end three-phase three-level T-type power factor correction (PFC) circuit according to claim 14, further comprising the modified SVPWM and an associated variable-amplitude double-carrier sine-triangle PWM to operate the front-end three phase three level T type PFC circuit such that input phase current distortions due to capacitor middle point voltage deviations are eliminated.

17. The method for controlling a front-end three-phase three-level T-type power factor correction (PFC) circuit according to claim 16, further comprising generating a phase leg rectification voltage command Va*, Vb*or Vc* through the rectifier voltage space vector $\overrightarrow{v_{ref}}$ by the inverse Clarke transformation and by incorporating a common mode voltage implementing a primary capacitor bank middle point voltage control parameter k; and further comprising carrying out a three-level sine-triangle PWM process by comparing the phase leg rectification voltage command Va*, Vb*, Vc* with the double carrier waveforms in generating a plurality of phase leg switching functions.

* * * * *